United States Patent

[11] 3,619,593

| [72] | Inventors | Arthur J. Hollis<br>Danvers;<br>Ronald Dana Cluett, Gloucester, both of Mass. |
|---|---|---|
| [21] | Appl. No. | 815,904 |
| [22] | Filed | Apr. 14, 1969 |
| [45] | Patented | Nov. 9, 1971 |
| [73] | Assignee | Sylvania Electric Products, Inc. |

[54] AUTOMOBILE HEADLIGHT COMPENSATOR
1 Claim, 5 Drawing Figs.

[52] U.S. Cl. .................................................. 240/7.1 LJ,
240/62, 335/145, 337/38, 337/102
[51] Int. Cl. ................................................................ B60q 1/10
[50] Field of Search ............................................ 240/57, 7.1
R, 7.1 LJ, 61.2, 61.8, 61.9, 62; 335/145; 337/335,
354, 102, 38, 1, 378, 377

[56] References Cited
UNITED STATES PATENTS

| 1,852,333 | 4/1932 | Phelan.......................... | 337/38 |
| 1,894,842 | 1/1933 | Appelberg..................... | 337/335 |
| 2,714,143 | 7/1955 | Whitman et al. ............. | 337/1 |
| 2,820,925 | 11/1958 | Schmidt, Jr.................... | 240/61.9 X |
| 3,044,295 | 7/1962 | Shivers......................... | 337/335 X |
| 3,238,779 | 3/1966 | Wolfe............................ | 337/378 X |
| 3,328,571 | 6/1967 | Cibie............................. | 240/61.8 X |

FOREIGN PATENTS

| 517,637 | 2/1953 | Belgium ...................... | 240/62 |

Primary Examiner—Joseph F. Peters
Attorneys—Norman J. O'Malley and James Theodosopoulos

ABSTRACT: A pivotally mounted headlight is supported against a thermostatic bimetal pile. Upon the application of an electrical current to a resistance heater associated with the pile, the pile is activated and vertically deflects the headlight in a predetermined manner.

PATENTED NOV 9 1971    3,619,593

ARTHUR J. HOLLIS
RONALD D. CLUETT
INVENTORS

BY

AGENT

ARTHUR J. HOLLIS
RONALD D. CLUETT
INVENTORS
BY
AGENT

AUTOMOBILE HEADLIGHT COMPENSATOR

BACKGROUND OF THE INVENTION

1. Field of the Invention

This invention relates to the field of automobile headlights and more particularly to such headlights automatically compensable for vertical deviations from a predetermined axis of projection.

2. Description of the Prior Art

In the past few years, highly directional automobile headlights have been developed which are capable of accurately projecting a small rectangular beam of glare-free light onto the roadway a sizeable distance ahead of a moving automobile. Because of the brightness of the beam, the headlight must be accurately aimed at the time of mounting in order to avoid shining into the eyes of oncoming drivers. The vertical mounting tolerance required is often less than one-half°.

However, when the rear of the automobile is loaded down, such as by a full gasoline tank or by passengers sitting in the rear seat, the aim of the headlight is raised and light therefrom can shine into the eyes of oncoming drivers. It would be desirable, in such cases, to automatically restore the aim of the headlight to its original focused position.

SUMMARY OF THE INVENTION

An automobile headlight compensator, in accordance with this invention, comprises a thermostatic, bimetal disc pile in operative relationship with a headlight housing. A resistance heater is in an efficient heat-transfer relationship with the pile. Upon the passage of an electric current through the heater, the bimetal pile is heated and the discs thereof expand and increase the pile height. The disc expansions cause a movable member associated with the pile to push against the headlight housing and deflect it downward.

Upon cessation of the heater current, the bimetallic discs cool and flatten, thereby reducing the effective pile height. By means of spring action, the movable member and headlight housing are returned to the original unenergized position upon complete cooling of the pile.

Heater current flow is controlled by an electromechanical switch suitably mounted at the rear of an automobile. When the rear of the automobile sags a predetermined amount, say, 1 inch, the switch is activated and permits current from the automobile electric supply to flow through the heater. Upon removal of the sagging load, the switch opens and stops the current flow.

In a preferred construction, the pile comprises a series of paired bimetallic discs, mounted on a common axis with each pair in substantially flat contact with adjacent pairs. Each bimetallic disc has a high-expansion side and a low-expansion side. A pair comprises two discs in flat contact on their low-expansion side. Upon heating of a disc, it expands and bends in the direction of the low-expansion side. Thus, in a heated pair of discs, their centers will move axially apart while the edges of the discs remain in contact. The deflection of a pile is the cumulative deflection of the disc pairs and the disc pile operates with straight line motion. In a preferred construction, one or more circular resistance heaters are sandwiched within the pile. The heater is flat to provide good contact and heat transfer to the discs on either side thereof. The heater is activated by closure of the previously mentioned switch at the rear of the automobile and current flows therethrough as long as the switch is closed.

DESCRIPTION OF THE PREFERRED EMBODIMENT

Figure 1:
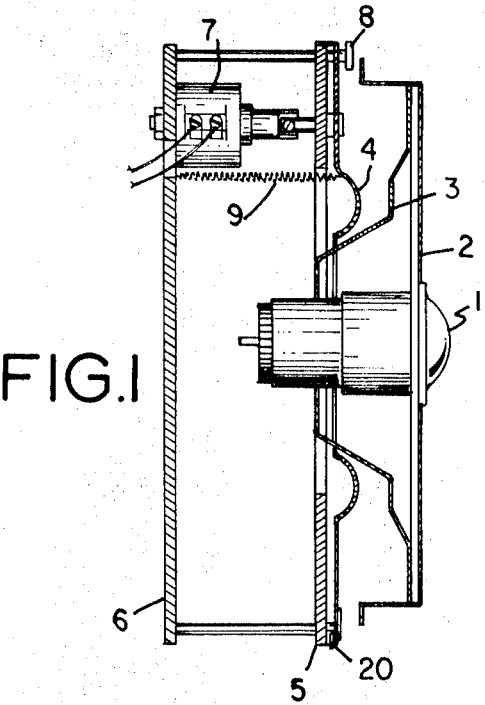
FIG. 1 is an illustration of a compensator and a headlight housing in accordance with this invention.

As shown in FIG. 1, automobile headlight 1 is supported in a lamp-holding ring 2 which, in turn, is supported by adjusting ring 3. Holding ring 2 supports headlight 1 around the periphery thereof and ring 3 is adjustably attached to holding ring 2. Thus, after the headlight assembly has been installed on an automobile, the headlight beam may be accurately aimed by adjusting ring 3.

Adjusting ring 3 is fixedly attached to housing 4, housing 4 being the main support member for the headlight assembly. Housing 4 has a clearance hole at the center thereof through which the back of the headlight extends.

Housing 4 is attached by means of pivot 20, to mounting plate 5 which, in turn, is rigidly attached to a convenient structural member 6 of the automobile. Pivot 20 is preferably located below the centerline of headlight 1.

Figure 2:
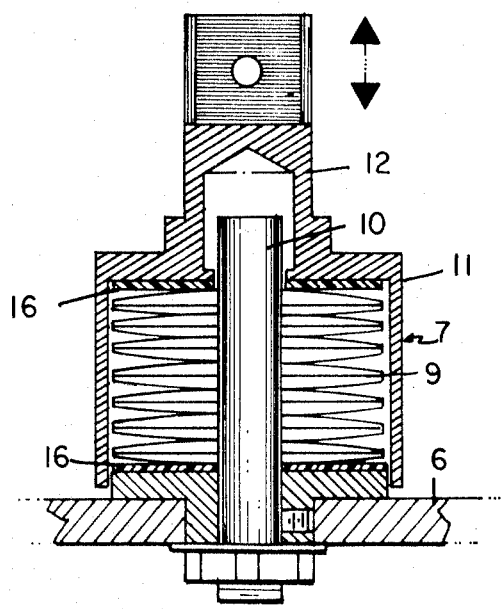
FIG. 2 is an enlarged cross-sectional view of the compensator.

One end of compensator 7 is fastened to the upper portion of member 6 and the other end protrudes through plate 5 and bears against the upper portion of housing 4, preferably directly above the centerline of headlight 1. Upon activation, compensator 7 expands and pushes the upper portion of housing 4 forward, thereby deflecting downward the aim of the headlight beam. Stop nut 8 is mounted on plate 5 and limits the forward travel of housing 4 a predetermined distance. Return spring 9 is tensionally connected between member 6 and housing 4 in order to draw housing 4 back to its original position upon deactivation and cooling of compensator 7. As shown in FIG. 2, compensator 7 comprises a stack of thermostatic bimetal disc pairs 9. Shaft 10 extends through the center of the stack and has a diameter slightly less than the diameter of a hole through the center of each disc. Thus, shaft 10 aligns the discs with each other but permits the discs to move axially thereon. One end of shaft 10 is fixedly attached to structural member 6 and the other end extends beyond the top of the stack. A cylindrical casing 11, closed at one end, covers and surrounds the disc stack. The open end of casing 11 extends as far as structural member 6 but is not secured thereto. The closed end of casing 11 rests on the uppermost disc of the disc stack. Attached to the closed end of casing 11 is rod 12, rod 12 being the portion of compensator 7 that bears against housing 4. A closed clearance hole in rod 12 and casing 11 permits the free end of shaft 10 to extend therein.

Figure 3:
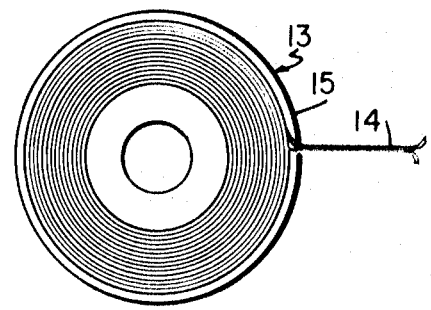
FIG. 3 is an illustration of a flat heater.
Figure 5:
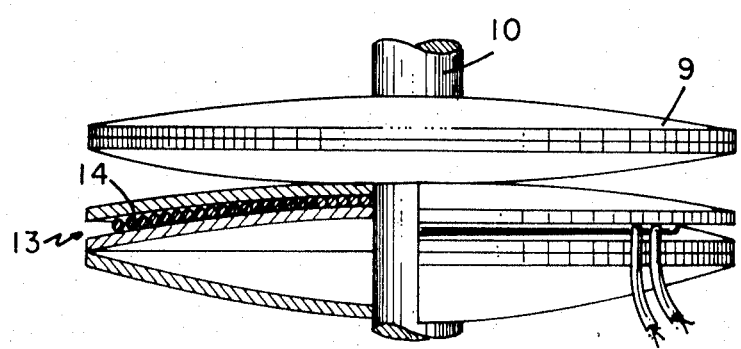
FIG. 5 is an enlarged view, partly in section, of a heater within a disc pile.

Sandwiched in the disc pile is flat resistance heater 13, shown in more detail in FIGS. 3 and 5. Heater 13 comprises a single length of insulated resistance-heating wire 14 bifilarly and concentrically wound on bimetal disc 15, the ends of wire 14 protruding beyond the edge of disc 15. Disc 15 has the same diameter and the same clearance hole as have discs 9. The coiled portion of wire 14 is bonded to disc 15 by heat-resistant adhesive.

As shown in FIG. 5, heater 13 is bonded to the high-expansion side of disc 15 and the bonded heater is then sandwiched between a disc pair. In order to maintain intimate heater contact and efficient heat transfer during expansion of the discs, the upper disc of the disc pair is mounted in contact with heater 13 so as to curve in the same direction as disc 15.

The ends of heater wire 14 are connected to an electrical power source, such as an automobile battery, through a normally open electromechanical switch (not shown) mounted at the rear of the automobile as mentioned above in Summary of the Invention. Upon sagging of the rear of the automobile and closure of the switch, electric current flows through hater 13 thereby raising the temperature thereof. Heat is conducted to the disc pairs in the stack and they expand, as previously mentioned. The expansion results in axial movement of rod 12 which, in turn, pushes the upper portion of housing 4 forward.

In order to reduce heat losses from the stack, insulating spacers 16, such as mica, are placed adjacent to the end discs.

Figure 4:
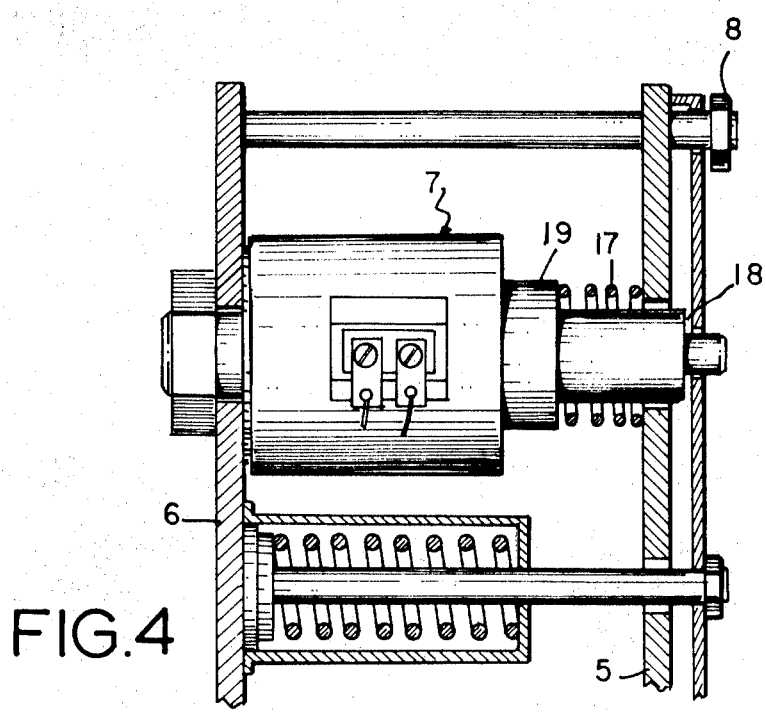
FIG. 4 is an enlarged cross-sectional view of another embodiment of a mounted compensator.

In the embodiment shown in FIG. 4, there is a gap 18 between rod 12 and housing 4 arranged so as to require a pile temperature of about 150° F. before rod 12 will engage housing 4. The purpose of the gap is to prevent deflection of housing 4 due to high environmental temperatures. A rod return spring 17 is compressively mounted between mounting plate 5 and shoulder 19 of rod 12 in order to maintain continuous contact of casing 11 on the disc pile.

In FIG. 4, return spring 9 is compressively mounted between member 6 and housing 4. Upon forward movement of housing 4, spring 9 is compressed further. Spring 9 is arranged to exert greater force than spring 17, so that, upon cooling of the pile, housing 4 is returned to its original position.

In one example, a compensator had two heaters 13, spaced apart from each other, in parallel within the disc pile. The two heaters had a resistance of 5.8 ohms and drew 2.3 amperes of current at initial circuit closure. In 2 minutes, rod 12 had moved forward 0.060 inches against a 10-pound force exerted by return spring 9. In 4 minutes the rod was exerting a force of 15 pounds against stop nut 8. An advantage to this slow thermal response is that the headlight will be deflected only where there is more than an intermittent closing of the above-mentioned switch. Such an intermittent closing might occur when an automobile is driven over a short stretch of bumpy road; in such a case it would not be desirable to deflect the headlight downward. In a situation where, in addition to a bumpy road, the rear of the automobile is moderately loaded, the switch would be cycled intermittently and the heat generated in the disc pile would cause the headlight to assume an intermediate position.

A preferred heater wire 14 is one having a high-positive temperature coefficient of resistance, such as nickel-iron alloys. Such a wire provides higher initial heater wattages at cooler ambient temperatures, thus enhancing the compensator's cold weather response. In addition, it partially compensates for heater wattage variations caused by the wide voltage fluctuations normally encountered in an automotive electrical system.

However, for the purposes of this invention, it is not necessary that the construction of heater 13 be limited to resistance-heating wire. For example, a deposited resistance film on a flexible insulated disc may be satisfactory. Or a heater could even be inserted within a hollow shaft 10, in which case the response time of the compensator would be longer.

Although the above examples show only downward headlight deflection upon activation of the compensator, the compensator may be installed to deflect a headlight upwards upon activation. In such a case the switch at the rear of the automobile would be normally closed, but would open when the rear was loaded. A safety feature of this installation is that, in the event the compensator failed, the headlight would maintain its downward projecting position.

We claim:

1. In an automobile headlight compensator, the combination comprising: a pivotally mounted headlight housing; a thermostatic bimetal disc pile, one end of which is fixedly mounted and the other end of which is axially movable and in such register with said housing that the housing pivots upon thermal expansion of the disc pile, said register including an ambient temperature compensating gap; a flat resistance heater sandwiched between the discs of said disc pile, said heater comprising a coiled length of wire bonded to a bimetal disc, said wire having a positive temperature coefficient of electrical resistance; means for energizing the heater, the energizing means including a switch mounted at the rear of an automobile, the switch being actuated upon sagging of the rear of the automobile; and spring means in engagement with said housing, said spring means being constructed so as to return said housing to its undeflected position when said disc pile is cooled to its ambient temperature.

* * * * *